US009202063B1

(12) United States Patent
Ekke et al.

(10) Patent No.: US 9,202,063 B1
(45) Date of Patent: Dec. 1, 2015

(54) MONITORING NETWORK-BASED PRINTING FOR DATA LOSS PREVENTION (DLP)

(75) Inventors: Prasad D. Ekke, Pune (IN); Milind Torney, Pune (IN)

(73) Assignee: SYMANTEC CORPORATION, Mountain View, CA (US)

( * ) Notice: Subject to any disclaimer, the term of this patent is extended or adjusted under 35 U.S.C. 154(b) by 572 days.

(21) Appl. No.: 13/453,214

(22) Filed: Apr. 23, 2012

(51) Int. Cl.
*G06F 21/60* (2013.01)

(52) U.S. Cl.
CPC ...................... *G06F 21/60* (2013.01)

(58) Field of Classification Search
None
See application file for complete search history.

(56) References Cited

U.S. PATENT DOCUMENTS

| 8,321,560 | B1 * | 11/2012 | Pai et al. | 709/224 |
|---|---|---|---|---|
| 2002/0001495 | A1 * | 1/2002 | Mochizuki | 400/61 |
| 2011/0292878 | A1 * | 12/2011 | Ozawa | 370/328 |
| 2012/0291087 | A1 * | 11/2012 | Agrawal | 726/1 |

OTHER PUBLICATIONS

No Author, "Print Manager Pluse®," Enterprise Brochure, Nov. 1, 2011, 1 page, Internet: <https://www.printmanager.com/products/materials/pmp_enterprise/pmp_enterprise_brochure.pdf>.
Scott Byer, "Cloud Print Connector Policy," Chromium, Revision 110332, Nov. 16, 2011, 2 pages, Internet: <http://src.chromium.org/viewvc/chrome?revision=110332&view=revision>.
No Author, "Print Manager Plus Web Advantage Suite Option," Product Features Page, Feb. 17, 2012, 7 pages, Internet: <https://web.archive.org/web/20120217134053/http://www.softwareshelf.com/products/release_station_features.htm>.

* cited by examiner

*Primary Examiner* — Jeremiah Bryar
(74) *Attorney, Agent, or Firm* — Lowenstein Sandler LLP (57) ABSTRACT

A method and apparatus for monitoring network-based printing for data loss prevention (DLP). A DLP system may monitor outbound data transfers performed by a computing system, and detect a network print request in a current one of the outbound data transfers being sent to a network-based printer over a network, the network print request identifying data to be printed by the network-based printer. The DLP system determines whether the identified data of the current outbound data transfer violates a DLP policy and prevents the current outbound data transfer when the current outbound data transfer violates the DLP policy.

20 Claims, 4 Drawing Sheets

MONITORING NETWORK-BASED PRINTING FOR DATA LOSS PREVENTION (DLP)

TECHNICAL FIELD

Embodiments of the invention relate to the field of processing data, and more particularly, to monitoring network-based printing for data loss prevention (DLP).

BACKGROUND OF THE INVENTION

A modern organization typically maintains a data storage system to store and deliver sensitive information concerning various significant business aspects of the organization. Sensitive information may include data on customers (or patients), contracts, deliveries, supplies, employees, manufacturing, or the like. In addition, sensitive information may include intellectual property (IP) of an organization such as software code developed by employees of the organization, documents describing inventions conceived by employees of the organization, etc.

Organizations take lot of efforts to install DLP components, especially on important machines where confidential data is getting generated, but they may not be able to protect each computer in the enterprise, due to reasons like large number of different platforms or operating systems (OS), machine outages, quick and dynamic provisioning of virtual machines, no clear and individual accounting for test and lab machines. DLP technologies apply configurable rules to identify objects, such as files, that contain sensitive data and should not be found outside of a particular enterprise or specific set of host computers or storage devices. Even when these technologies are deployed, it is possible for sensitive objects to 'leak'. Occasionally, leakage is deliberate and malicious, but often it is accidental too. For example, in today's global marketplace environment, a user of a computing system transmits data, knowingly or unknowingly, to a growing number of entities outside a computer network of an organization or enterprise. Previously, the number of entities were very limited, and within a very safe environment. For example, each person in an enterprise would just have a single desktop computer, and a limited number of software applications installed on the computer with predictable behavior. More recently, communications between entities may be complex and difficult for a human to monitor.

A very simple way that data losses can happen in a company is that people may print data on a network-based printer. Network-based printing, also referred to as cloud based printing, enables any application to print data, such as a document, by sending the data to any cloud-connected printer. Any user in an enterprise can easily print any document to remote printer, bypassing current security and auditing systems. Browsers may have built-in support for these network-based printers, such as the Chrome® browser and the Google® Cloud Print (GCP) service. GCP service is a web service, offered by Google of Mountain View, Calif., that enables any application (web, mobile, desktop) on any device to print any cloud-connected printer. Users associate printers with their Google Account. Printers are treated in much the same way as documents are in Google Docs: it is very easy to share printers with your coworkers, friends, and family anywhere in the world. In addition to associating printers with a user's Google Account, GCP also stores the capabilities of each particular printer model so that the appropriate printer options can be shown to the user when submitting a print job. Once the service receives a print job, it sends it to the printer. The service also receives regular updates on the status of the print job from the printer and makes this status available to the application. Any type of application can use Google Cloud Print, including web apps (such as Gmail and certain third-party apps) and native apps (such as a desktop word processor or an Android/iOS device). These apps call Google Cloud Print APIs. They can use these APIs to collect the necessary data to show their own user interface for custom print options or simply use the common print dialog that Google Cloud Print provides. There are also APIs for querying print job status. Google Cloud Print is now integrated with the mobile Gmail® service and mobile Google® Docs service, and third-party app developers can use the Google® Cloud Print service in their web, desktop, and mobile applications as well.

SUMMARY OF THE INVENTION

A method and apparatus for monitoring network-based printing for data loss prevention (DLP). A DLP system may monitor outbound data transfers performed by a computing system, and detect a network print request in a current one of the outbound data transfers being sent to a network-based printer over a network, the network print request identifying data to be printed by the network-based printer. The DLP system determines whether the identified data of the current outbound data transfer violates a DLP policy and prevents the current outbound data transfer when the current outbound data transfer violates the DLP policy.

In one embodiment of a method, processing logic (e.g., hardware, software, firmware, or any combination thereof) monitors, by a DLP system, outbound data transfers performed by the computing system, detects a network print request in a current one of the outbound data transfers being sent to a network-based printer over a network, the network print request identifying data to be printed by the network-based printer. The processing logic determines whether the identified data of the current outbound data transfer violates a DLP policy, and prevents the current outbound data transfer when the current outbound data transfer violates the DLP policy. In one embodiment, the DLP system is a DLP agent executing on the computing system and the computing system is an endpoint machine in the network. In another embodiment, the DLP system executes on a gateway that receives the outbound data transfers from one or more endpoint machines in the network.

In a further embodiment, the processing logic detects the violation of the DLP policy by detecting that the current outbound data transfer comprises protected information. In one embodiment, the current outbound data transfer is to a second computing system associated with the network-based printer. In another embodiment, the computing system and the second computing system reside in a same private network. In another embodiment, the second computing system resides in a different network than the network of the computing system. In another embodiment, the current outbound data transfer is to the network-based printer identifies in a network-based print service. The network-based printer may reside in a different network than the network of the computing system.

In a further embodiment, the processing logic notifies an administrator of the network when the current outbound data transfer violates the DLP policy. In another embodiment, the processing logic notifies a user of the computing system when the current outbound data transfer violates the DLP policy. Alternatively, the processing logic may notify other people or may record the violation incident in a data store.

In a further embodiment, the processing logic monitors by intercepting network packets, and detects the network print request by identifying which of the network packets contain the network print request, and parsing the network print request to extract printing information. The processing logic can determine whether the data of the current outbound data transfer violates the DLP policy by extracting the data from the network packet containing the network print request, and scanning the extracted data for violations of the DLP policy. The extracted data is the data to be printed by the network-based printer. In another embodiment, the processing logic determines if there is a violation by extracting file path information in the network print request. The file path information identifying data to be printed by the network-based printer. The processing logic locates the data using the file path information, and scans the data located using the file path information to determine whether the data violates the DLP policy. In another embodiment, the processing logic determines whether there is a violation by buffering a plurality of network packets containing data associated with the network print request, and scanning the extracted data from the plurality of network packets to determine whether the extracted data violates the DLP policy. The extracted data is the identified data to be printed by the network-based printer.

In addition, a computer readable storage medium for monitoring network-based printing for DLP is described. An exemplary computer readable storage medium provides instructions, which when executed on a processing system causes the processing system to perform a method such as the exemplary methods discussed above.

Further, systems and apparatus of a DLP system containing a network printing monitor are described. An exemplary apparatus may include a memory and a processor coupled to the memory. The processor is configured to execute the network printing monitor to perform various operations, such as those described above.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

A method and apparatus for monitoring network-based printing for data loss prevention (DLP). A DLP system may monitor outbound data transfers performed by a computing system, and detect a network print request in a current one of the outbound data transfers being sent to a network-based printer over a network, the network print request identifying data to be printed by the network-based printer. The DLP system determines whether the identified data of the current outbound data transfer violates a DLP policy and prevents the current outbound data transfer when the current outbound data transfer violates the DLP policy. In the following description, numerous details are set forth. It will be apparent, however, to one of ordinary skill in the art having the benefit of this disclosure, that embodiments of the present invention may be practiced without these specific details.

Figure 1:
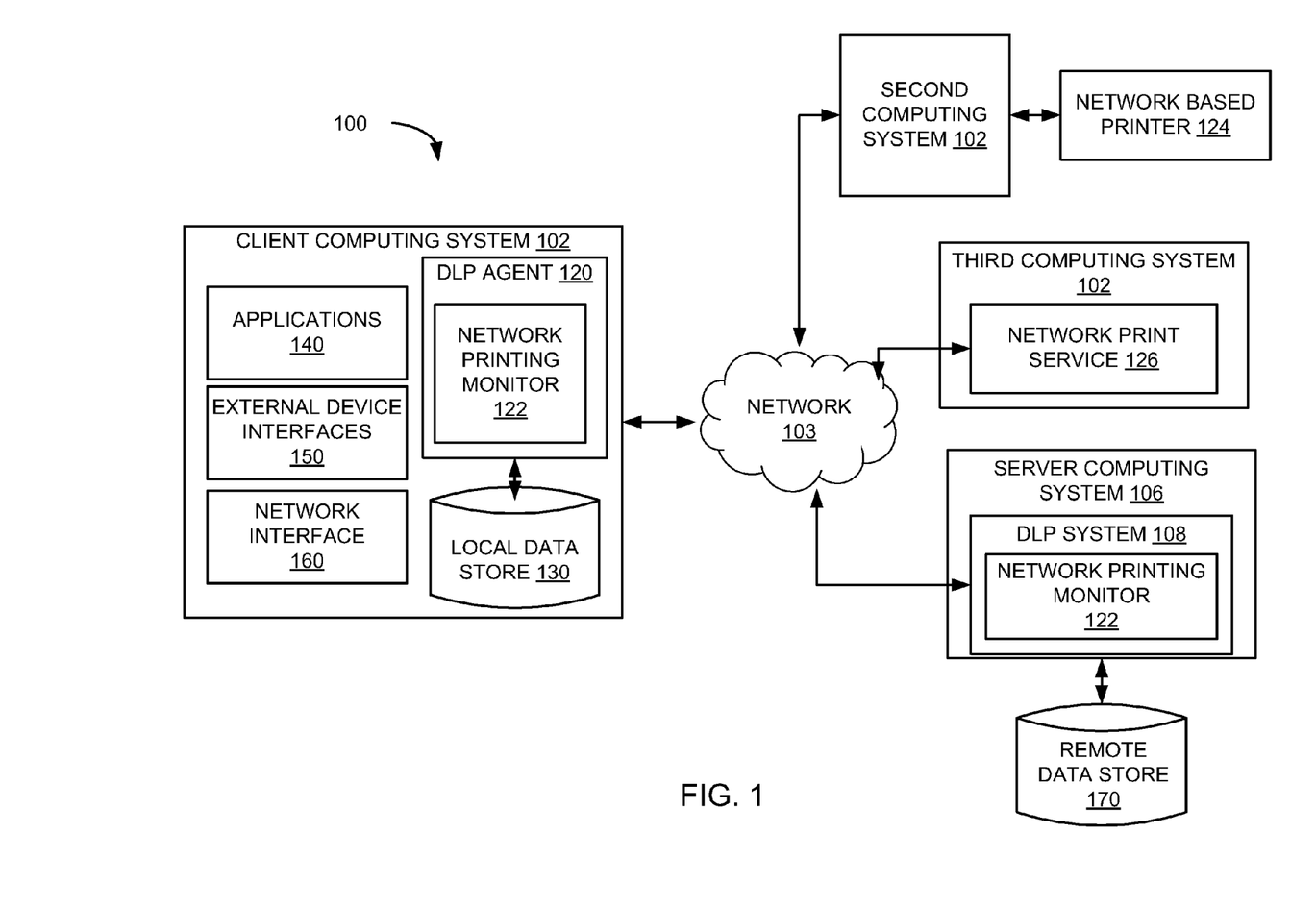
FIG. 1 is a block diagram of exemplary network architecture in which embodiments of a network printing monitor may operate.

FIG. 1 is a block diagram of an exemplary network architecture 100 in which embodiments of a network printing monitor 122 may operate. The network architecture 100 may include multiple client computing systems 102 and a server computing system 106 coupled via a network 103 (e.g., public network such as the Internet or private network such as a local area network (LAN)). The client computing system 102 may include personal computers, laptops, PDAs, mobile phones, network appliances, etc. The server computing system 106 may be a network appliance, a gateway, a personal computer, etc. The client computing systems 102 and the server computing system 106 may reside on the same LAN, or on different LANs that may be coupled together via the Internet, but separated by firewalls, routers, and/or other network devices. In another embodiment, the computing systems may reside on different networks. The server computing systems 106 may host a DLP system 108. In one embodiment, the client computing systems 102 and server computing systems 106 may be part of an organization, such as a corporate enterprise. Alternatively, the server computing system 106 and the computing systems 102 may be part of different organizations.

The DLP system 108 may communicate with DLP agents 120. Although the embodiments may be used in a DLP system using DLP agents 120, the embodiments may also be used in other DLP products. For example, as depicted in FIG. 1, the DLP system 108 may host the network printing monitor 122 to monitor for network-based printing for DLP. In another embodiment, the server computing system 106 hosts the DLP system 108 and the network printing monitor 122 is installed and operated in one or more gateways on the network 103. Also, the embodiments described herein may be used in other applications that can be used for detecting violations of policies other than DLP policies.

The DLP agents 120 include a network printing monitor 122, which is configured to determine whether outbound data transfers violate DLP policies. In one embodiment, the DLP agent 120 monitors outbound data transfers by the client computing system 102 (e.g., transmitting entity) to other devices, such as a second computing system 102 that is coupled to a network-based printer 124 or a third computing system 102 that hosts a network print service 126. The network print service 126 may be a cloud print service like Google Cloud Print. When a violation is detected in one of the data transfers, the network printing monitor 122 prevents the outbound data transfer to the network-based printer (e.g., 124 or 126). Although the second and third computing system 102 are depicted as part of the same network as the client computing system 102, the second and third computing systems 102 may reside on different networks than the client computing system 102. For example, in one embodiment, the client computing system 102 attempts to send a network print request to the network print service 126 over the Internet, and the network printing monitor 122 determines that the network print request violates the DLP policy and thus prevents the network print request.

The DLP system 108 may communicate with DLP agents 120 on the client computing systems 102 to perform operations to enforce a DLP policy as described herein. The DLP agent 120 is configured to detect a violation of a DLP policy in the outbound data transfers. When a violation is detected, the network printing monitor 122 can perform one or more preventative operations, and even notification operations. Alternatively, the network printer 122 can communicate with the DLP system 108 to perform the preventative or notification operations. In one embodiment, the DLP agent 120 creates an incident record of the violation, and may send the incident record to the DLP system 108, for example. The DLP system 108 is configured to receive the incident record of the violation from the DLP agent 120. In these embodiments, the DLP agent 120 creates the incident records. However, in other embodiments, any DLP product may be used to detect a violation and create an incident, and it is not limited to using DLP agents on an endpoint machine, as described herein. It should also be noted that other systems than DLP systems can use the network printing monitor 122 to determine whether the destination entity has sufficient protections to protect the data before sending the data to the different entities.

Although only one server computing systems 106 are illustrated in FIG. 1, the DLP system 108 may be hosted on one or more machines, including one or more server computers, client computers, gateways or other computing devices. In yet another configuration, the DLP service may reside on a single server, or on different servers, coupled to other devices via a public network (e.g., the Internet) or a private network (e.g., LAN). In one embodiment, the DLP system 108 is part of an organization's system referred to herein as entity. In another embodiment, a service provider hosts the DLP system 108. The hosted service provider may also have multiple instances of the DLP system 108 on multiple networks that communicate with the service provider over a public or private network. It should be noted that various other network configurations can be used including, for example, hosted configurations, distributed configurations, centralized configurations, etc.

The depicted client computing system 102, which may operate as an endpoint machine in an enterprise network that uses the DLP system 108 to enforce one or more DLP policies, includes a DLP agent 120 that communicates with the DLP system 108. Embodiments of the DLP agent 120, which includes the network printing monitor 122, are described below with respect to FIGS. 2-3. The client computing system 102 may include applications 140, external device interfaces 150, and network interfaces 160 that can be monitored by the DLP agent 102. As described herein, in one embodiment, the network printing monitor monitors network traffic on the network interface 160 to detect network printer requests. The network printing monitor 122 extracts printing information from the network print request and uses the printing information to scan the data being printed. If the data being printed violates the DLP policy, the network printing monitor 122 prevents the network print request. Alternatively, the DLP agent 102 can monitor other aspects of the client computing system 102 to monitor outbound data transfers.

The client computing system 102 may also include a local data store 130, which can be one or more centralized data repositories that store the violation information, DLP policy information, and the like. The local data store 130 may represent a single or multiple data structures (databases, repositories, files, etc.) residing on one or more mass storage devices, such as magnetic or optical storage based disks, tapes or hard drives. Although illustrated as being local to the client computing system 102, the local data store 130 may be remote from the client computing system 102 and the client computing system 102 can communicate with the local data store 130 over a public or private network. For example, in one embodiment, the server computing system 106 is communicatively coupled with a remote data store 170. The remote data store 170 may represent a single or multiple data structure residing on one or more mass storage devices.

Figure 2:
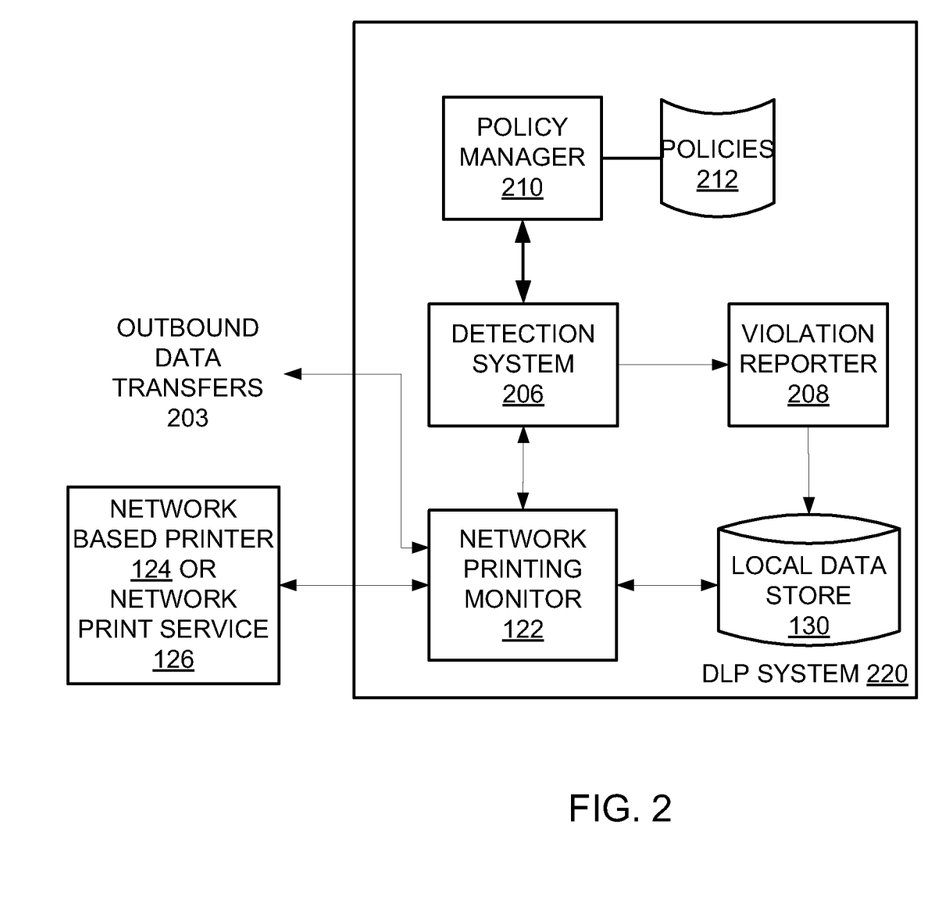
FIG. 2 is a block diagram of one embodiment of a DLP agent, including a network printing monitor and a detection system to detect violations of a DLP policy.

FIG. 2 is a block diagram of one embodiment of a DLP system 220, including the network printing monitor 122 and a detection system 206 to detect violations of a DLP policy. In one embodiment, the DLP system 220 is the DLP agent 120 of FIG. 1. In another embodiment, the DLP system is the DLP system 108 of FIG. 1. The DLP system 220 may also includes a violation reporter 208, a policy manager 210, and a policy data store 212. In the depicted embodiment, the detection system 206 is configured to monitor outbound data transfers 203. The outbound data transfers 203 may include data in transit, such as data associated with outgoing messages or other network traffic being sent by the client computing system 102 to a destination entity. The outbound data transfers 203 may also include data being printed, copied to a remote storage device, such as USB drive, a remote disk, or the like. The outbound data transfers 203 may be any data being transferred by the client computing system 102 via a wireless or wired connection to a destination entity, such as another device or to a remote device, such as, for example, a removable storage drive. The outbound data transfers 203 may be over the network 103 or over direct connections to the client computing system 102.

As part of, or in connection with, the monitoring by the detection system 206, the network printing monitor 122 is configured to detect a network print request, if any, in the outbound data transfers 203. The network print request includes printing information associated with a network print job. The printing information may include the data to be printed, a printing request, a print job name, a print job description, a destination of a network printer or a network print request to a network print service, path information to a file or data to be printed, or any other information related to a network print job. The network printing monitor 122, upon detecting the network print request can extract or otherwise obtain the data to be printed and can send the data to be printed to the detection system 206 to be scanned. The detection system 206 is configured to determine whether the data of the data transfer 203 violates a DLP policy. The detection system 206 is used to detect violations of the DLP policies 212 and may perform some remedial or notification operation to help enforce the DLP policies 212. In the embodiments described herein, when the detection system 206 detects a violation, it temporarily blocks the data transfer 203 and notifies the network printing monitor 122 of the violation. The network printing monitor 122 can prevent the current outbound data transfer when the current outbound data transfer violates the DLP policy. Alternatively, the detection system 206 can prevent the current outbound data transfer. However, if the detection system 206 does not detect a violation, the network printing monitor 122 (or detection system 206) can allow the data transfer. For example, the detection system 206 can notify the network printing monitor 122, and the network printing monitor 122 removes the temporary block on the data transfer 203, or vice versa. In some cases, the network printing monitor 122 may allow the transfer but generate an incident report and/or notify an administrator of the violation. In another embodiment, the detection system 206 can ask the user if they would like to proceed with the data transfer, alerting them to the fact that the network print request violates the DLP policy. Alternatively, the network printing monitor 122 and the detection system 206 can perform other remedial or preventative actions.

In some embodiments, the detection system 206 can alert a user or an administrator after determining whether the data of the network print request violates the DLP policy. Alternatively, the detection system 206 can alert both before and after this determination. Of course, the network printing monitor 122 can also be configured to alert the user, administrator, or both. The alert may contain information about the violation, the destination entity, and the protections at the destination entity.

In one embodiment, when the network printing monitor 122 (or detection system 206) determines that the data of the network print request violates one or more of the DLP policies 212, the violation reporter 208 creates an incident record of the violation and stores the incident record in the local data store 130. When the DLP system 220 is a DLP agent, the violation reporter 208 can send the incident record to the DLP system 108. The violation reporter 208 can send the incident records as they are generated or periodically. Similarly, the violation reporter 208 can send multiple incident records to the DLP system 108 in batches or sequentially. If a violation is detection, the violation reporter 208 may notify a system administrator (e.g., send an email or update a log file) about the policy violation incident, and may send information about the policy violation incident to the DLP service provider (e.g., DLP system 108). The information sent to the DLP service provider may identify, for example, the DLP policy being violated, the type of data being transferred, the destination entity specified to receive the data transfer, the DLP protection information of the destination entity, or other information concerning the violation, an identifier of the user or the client computing system 102 that caused the violation, as well as other information that may be helpful in remedying or recording the incidents. In another embodiment, the violation reporter 208 is configured to notify the user sending the network print request.

In one embodiment, the DLP system 220 includes the policy manager 210, which may be configured to define DLP policies 212 and stores them in the policy data store, such as in local data store 130 (or remote data store 170). The policy may require monitoring for data transfers, including those that include network print requests. The policy manager 210 may create DLP policies based on user input, such as from the user of the client computing system 102 or an administrator of an organization providing the client computing system 102. Alternatively, the policy manager 210 may receive DLP policies from a DLP service provider (e.g., DLP system 108) and store them in the policy data store 212. In the case of the DLP system 220 being a DLP agent, the DLP system 108 is configured to receive the incident record of the violation from the violation reporter 208, and may be configured to perform some remedial or reporting operation.

It should be noted that the DLP system 220 may include other components for monitoring outbound data transfers 203 for the data transfers to detect violations of the DLP policy, as well as other types of policies. Details regarding these other components have not been included to not obscure the description of the present embodiments.

Figure 3:
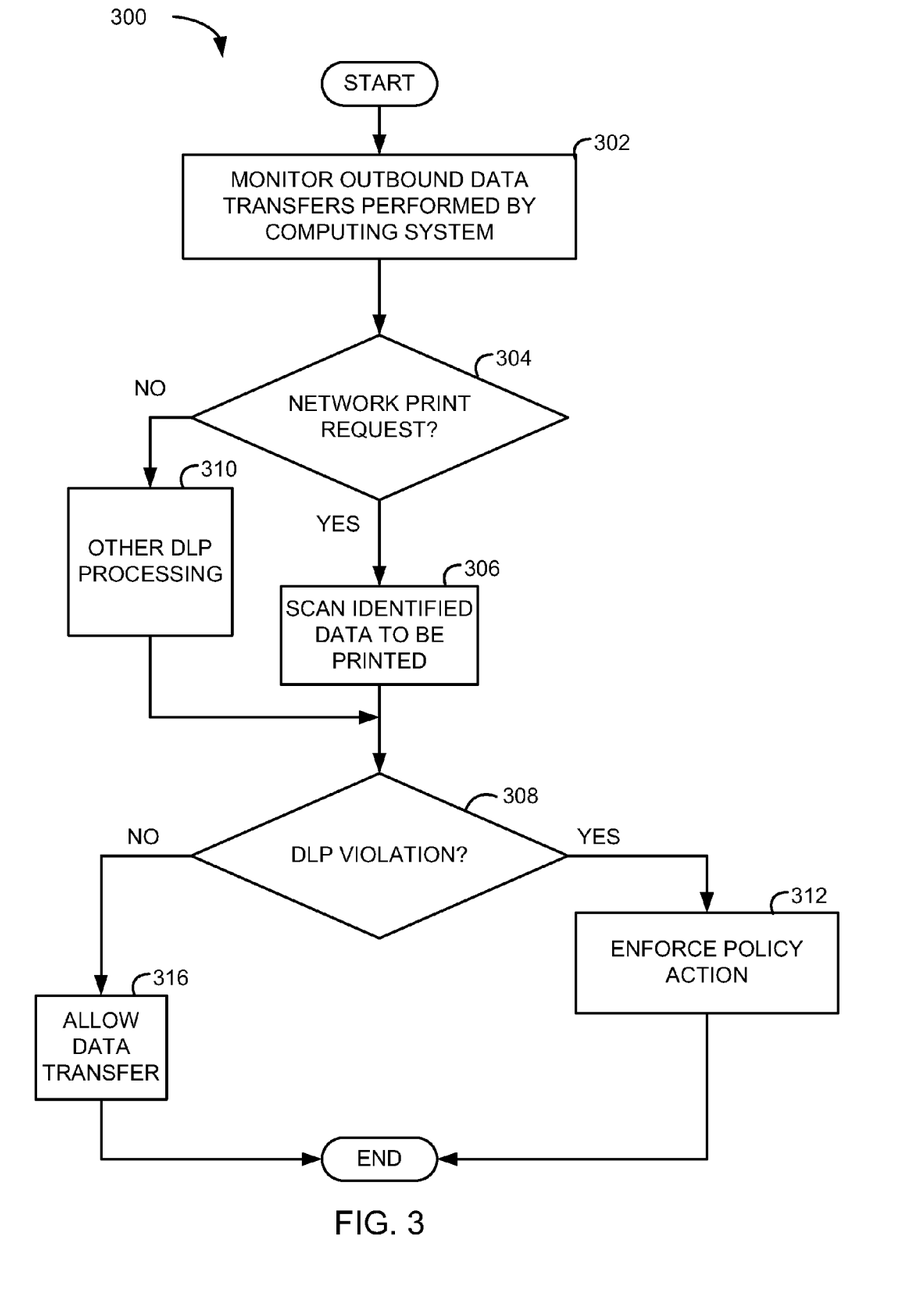
FIG. 3 is a flow diagram of one embodiment of a method of monitoring network-based printing for DLP.

FIG. 3 is a flow diagram of one embodiment of a method 300 of monitoring network-based printing for DLP. The method 300 is performed by processing logic that may comprise hardware (circuitry, dedicated logic, etc.), software (such as is run on a general purpose computing system or a dedicated machine), or a combination of both. In one embodiment, the client computing system 102 of FIG. 1 performs the method 300. In another embodiment, the DLP agent 120 of FIG. 1 performs the method 300. In another embodiment, the network print monitor 122 of FIGS. 1 and 2 performs the method 300. In another embodiment, the DLP system 220 of FIG. 2 performs the method 300. Alternatively, other components of the client computing system 102 and server computing system 106 can be configured to perform some or all of the method 300.

Referring to FIG. 3, processing logic begins method 300 by monitoring outbound data transfers performed by the computing system (block 302). In one embodiment, the processing logic monitors outbound network traffic to other devices over a private or public network. Alternatively, the processing logic monitors other outbound data transfers, such as data transfers to other devices via other types of connections, including transfers to a USB drive, FTP file transfers, printing activities, or the like. While monitoring in block 302, processing logic detects a network print request in a current one of the outbound data transfers being sent to a network-based printer over a network (block 304). The network print request identifies the data to be printed by the network-based printer. If the current outbound data transfer contains the network print request at block 304, the processing logic scans the identified data to be printed (block 306) and determines if the outbound data transfer violates a DLP policy (block 308). If the processing logic does not detect a network print request, the processing logic may perform other DLP processing operations on the monitor outbound data transfers (block 310), and determines if the outbound data transfer violates a DLP policy (block 308).

If the processing logic detects a policy violation at block 308, the processing logic prevents the current data transfer (block 312), and may create an incident record of the violation (block 314), returning to monitoring at block 302. In other embodiments, instead of preventing the data transfer, the processing logic may perform other operations as specified by the policy, such as notifying a system administrator, prompting the user to deny or allow the data transfer, and the like. If the processing logic does not detect a policy violation at block 306, the processing logic allows the data transfer (block 316), and returns to monitoring at block 302.

In another embodiment of the method, the processing logic monitors, by a DLP system, outbound data transfers performed by the computing system, and detects a network print request in a current one of the outbound data transfers being sent to a network-based printer over a network, the network print request identifying data to be printed by the network-based printer. The processing logic, using the DLP system, determines whether the identified data of the current outbound data transfer violates a DLP policy, and prevents the current outbound data transfer when the current outbound data transfer violates the DLP policy. In one embodiment, the DLP system is a DLP agent executing on the computing system and the computing system is an endpoint machine in the network. In another embodiment, the DLP system executes on a gateway that receives the outbound data transfers from one or more endpoint machines in the network.

In a further embodiment, the processing logic detects the violation of the DLP policy by detecting that the current outbound data transfer includes protected information. For example, the outbound data transfer may include confidential data, or other types of protected information. In one embodiment, the current outbound data transfer is to a second computing system associated with the network-based printer. In another embodiment, the computing system and the second computing system reside in a same private network. In another embodiment, the second computing system resides in a different network than the network of the computing system. In another embodiment, the current outbound data transfer is to the network-based printer identifies in a network-based print service. The network-based printer may reside in a different network than the network of the computing system.

In a further embodiment, the processing logic notifies an administrator of the network when the current outbound data transfer violates the DLP policy. In another embodiment, the processing logic notifies a user of the computing system when the current outbound data transfer violates the DLP policy. Alternatively, the processing logic may notify other people or may record the violation incident in a data store.

In a further embodiment, the processing logic monitors by intercepting network packets, and detects the network print request by identifying which of the network packets contain the network print request, and parsing the network print request to extract printing information. The processing logic can determine whether the data of the current outbound data transfer violates the DLP policy by extracting the data from the network packet containing the network print request, and scanning the extracted data for violations of the DLP policy. The extracted data is the data to be printed by the network-based printer. In another embodiment, the processing logic determines if there is a violation by extracting file path information in the network print request. The file path information identifying data to be printed by the network-based printer. The processing logic locates the data using the file path information, and scans the data located using the file path information to determine whether the data violates the DLP policy. In another embodiment, the processing logic determines whether there is a violation by buffering a plurality of network packets containing data associated with the network print request, and scanning the extracted data from the plurality of network packets to determine whether the extracted data violates the DLP policy. The extracted data is the identified data to be printed by the network-based printer.

In one embodiment of the method, the processing logic temporarily blocks the current outbound data transfer to a second computing system, a network-based printer, or a network printing service until the processing logic verifies that the current outbound data transfer does not violate the DLP policy. While temporarily blocking the data transfer, the processing logic may extract the data to be printed and scan the data to determine whether the data violates the policy. If the data to be printed does not violate the DLP policy, the processing logic permits the current data transfer, removing the temporary block and allowing the data transfer to occur. However, if the data to be printed violates the DLP policy, the processing logic prevents the current data transfer, and may create the incident record of the violation as described above.

The method 300 may be used to audit or monitor network-based printed (also referred to as cloud-based printed). The method 300 may monitor the network traffic generated by the cloud-printing enabled applications. As described herein, cloud print submission requests can be monitored and filtered either on an endpoint machine (e.g., using a DLP agent) or on a gateway (e.g., using a DLP agent on the gateway or a DLP system as described herein). The DLP agent or system can be used to allow content scanning using DLP scanning techniques to prevent loss of sensitive information via cloud printing.

As described above, cloud based printing enables any applications to print the document to any cloud-connected printer. Any user in an enterprise can easily print any document to remote printer bypassing current security and auditing systems. Some browsers like the Chrome® browser have built-in support for cloud printing. Additional types of applications may have support for cloud printing. For example, Google Cloud Print is a web service offered by Google. Any type of application can use Google Cloud Print, including web apps (such as Gmail and certain third-party apps) and native apps (such as a desktop word processor or an Android/iOS device). These apps call Google Cloud Print APIs. Using the embodiments described herein, the cloud based printing can be monitored for DLP.

In one embodiment, the method of network printing monitoring (e.g., network printing monitor 122) intercepts the outgoing network packets. This can be done using any possible interception mechanism. In one embodiment, the network printing monitoring uses a transport driver interface (TDI) driver for network packet interception. Alternatively, the network printing monitoring may use a network driver interface specification (NDIS) driver or the like for monitoring outbound data transfers. The network printing monitoring can identify the packets that contain cloud print requests (also referred to herein as network print request). The network printing monitoring can parse the requests and extract all the necessary information related to print job. For example, the printing information may include the data to be printed, printer identifier information, printing parameters, printer locations, or the like. In one embodiment, the network printing monitoring determines the data to be printed in two ways. In some cases, the data to be printed is fully available on the current packet. In these cases, the network printing monitoring can extract the data to be printed and analyzes the data for possible violations of one or more DLP policies. In other cases where the data to be printed is too large to be put into a single packet, the data to be printed may be split across multiple packets. In these cases, the network printing monitoring can analyze the data to be printed using two methods.

In a first method, which may be used in endpoint scenarios, the network printing monitoring can obtain the data to be printed using a file path information service running on the endpoint machine. In one embodiment, the file path information service is a service currently used by DLP product to keep track of files being opened by an application and can be used by the network print monitoring The file path information service can provide the network printing monitoring with the required file information based on queries by the network printing monitoring. In one embodiment, the file path information service can provide the network printing monitoring with the path of the file given the information such as the print job name and the initial content. For example, the network printing monitoring can extract the printing information from the print request and use the extracted printing information, such as the print job name, to request the file path information from the eservice.

In a second method, which may be used in gateway scenarios, the network printing monitoring can buffer packets, such as through integration. The network printing monitoring can gather obtain the data to be printed, even when split over multiple packets, from the buffered packets and can then analyze the data to be printed for possible DLP violations.

Figure 4:
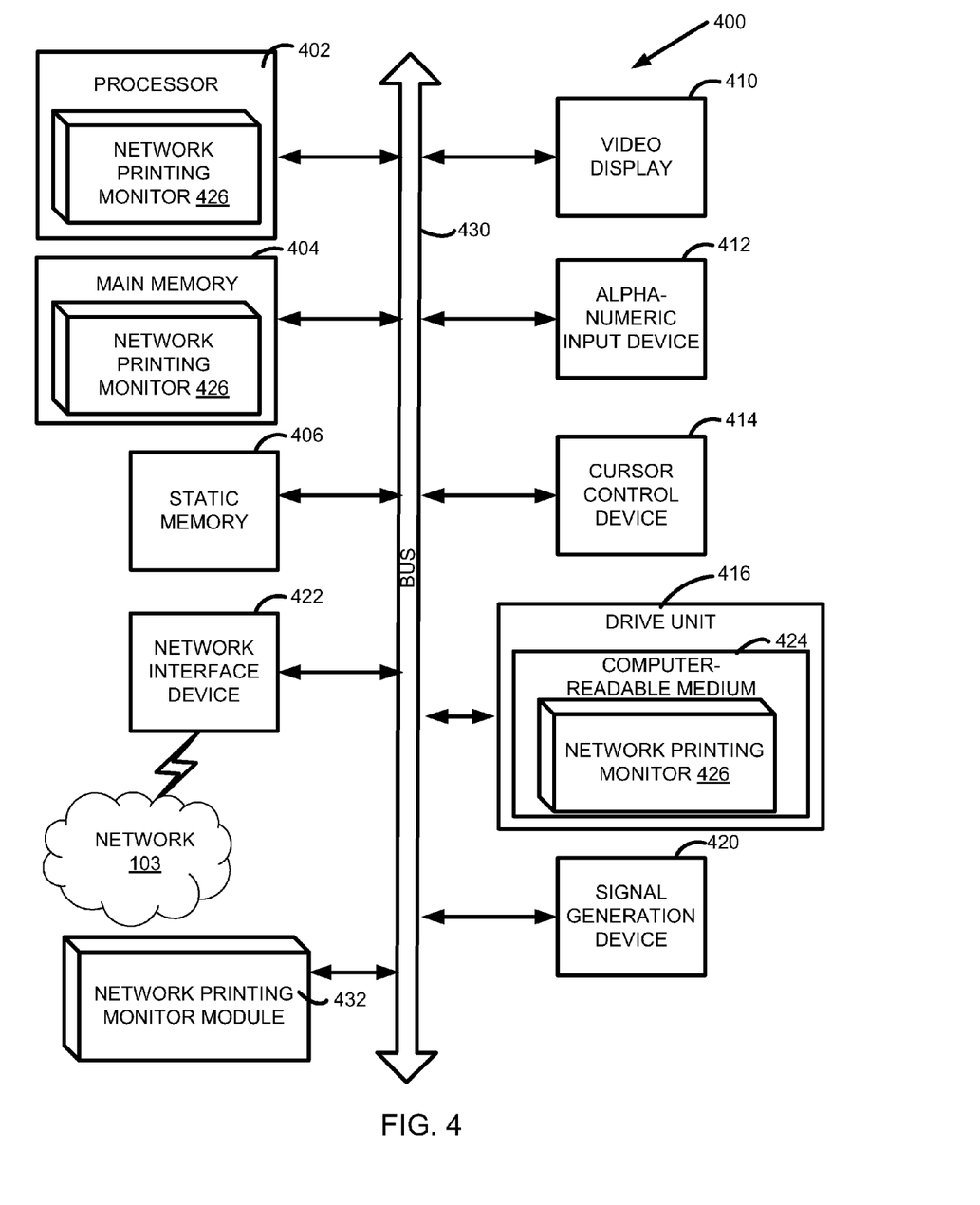
FIG. 4 illustrates a diagrammatic representation of a machine in the exemplary form of a computing system within which a set of instructions, for causing the machine to perform any one or more of the methodologies described herein, may be executed.

FIG. 4 illustrates a diagrammatic representation of a machine in the exemplary form of a computing system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as method 300 of FIG. 3.

The exemplary computing system 400 includes a processor 402, a main memory 404 (e.g., read-only memory (ROM), flash memory, dynamic random access memory (DRAM) such as synchronous DRAM (SDRAM), etc.), a static memory 406 (e.g., flash memory, static random access memory (SRAM), etc.), and a data storage device 418, which communicate with each other via a bus 406.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute the processing logic for network printing monitor 426 for performing the operations and steps discussed herein.

The computing system 400 may further include a network interface device 422. The computing system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a computer-readable medium 424 on which is stored one or more sets of instructions (e.g., network printing monitor 426) embodying any one or more of the methodologies or functions described herein. The network printing monitor 426 may also reside, completely or at least partially, within the main memory 404 and/or within the processor 402 during execution thereof by the computing system 400, the main memory 404 and the processor 402 constituting computer-readable media. The network printing monitor 426 may further be transmitted or received over a network 420 via the network interface device 422.

While the computer-readable storage medium 424 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, or other types of mediums for storing the instructions. The term "computer-readable transmission medium" shall be taken to include any medium that is capable of transmitting a set of instructions for execution by the machine to cause the machine to perform any one or more of the methodologies of the present embodiments.

The network printing monitor module 432, components, and other features described herein (for example in relation to FIGS. 1-2) can be implemented as discrete hardware components or integrated in the functionality of hardware components such as ASICS, FPGAs, DSPs, or similar devices. The network printing monitor module 432 may implement operations of network printing monitor as described herein with respect to FIG. 3. In addition, the network printing monitor module 432 can be implemented as firmware or functional circuitry within hardware devices. Further, the network printing monitor module 432 can be implemented in any combination hardware devices and software components.

In the above description, well-known structures and devices are shown in block diagram form, rather than in detail, in order to avoid obscuring the present invention. Some portions of the description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "storing", "monitoring", "creating", "generating", "sending", "intercepting," "capturing," "mapping", "generating," or the like, refer to the actions and processes of a computing system, or similar electronic computing system that manipulates and transforms data represented as physical (e.g., electronic) quantities within the computing system's registers and memories into other data similarly represented as physical quantities within the computing system's memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. As discussed above, such a computer program may be stored in a computer readable medium.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, implemented by a computing system programmed to perform the following, comprising:
    monitoring, by a data loss prevention (DLP) system, outbound data transfers performed by the computing system;
    detecting, by the DLP system, a network print request in a current one of the outbound data transfers being sent to a network-based printer over a network, the network print request identifying data to be printed by the network-based printer;
    determining whether the identified data of the current outbound data transfer violates a DLP policy; and
    enforcing a policy action when the current outbound data transfer violates the DLP policy.

2. The method of claim 1, wherein the DLP system is a DLP agent executing on the computing system that is an endpoint machine in the network.

3. The method of claim 1, wherein the computing system is a gateway that receives the outbound data transfers from one or more endpoint machines in the network.

4. The method of claim 1, wherein said detecting the violation of the DLP policy comprises detecting that the current outbound data transfer comprises protected information.

5. The method of claim 1, wherein the current outbound data transfer is to a second computing system associated with the network-based printer.

6. The method of claim 5, wherein the computing system and the second computing system reside in a same private network.

7. The method of claim 5, wherein the second computing system resides in a different network than the network of the computing system.

8. The method of claim 1, wherein the current outbound data transfer is to the network-based printer identifies in a network-based print service.

9. The method of claim 1, wherein the network-based printer resides in a different network than the network of the computing system.

10. The method of claim 1, wherein said enforcing the policy action comprises performing at least one of the following:
    preventing the current outbound data transfer;
    notifying an administrator of the network when the current outbound data transfer violates the DLP policy;
    creating an incident report of the violation;
    redacting the identified data from the current outbound data transfer; or
    encrypting the identified data from the current outbound data transfer.

11. The method of claim 1, wherein said monitoring comprises intercepting network packets, and wherein said detecting comprises:
    identifying which of the network packets contain the network print request; and
    parsing the network print request to extract printing information.

12. The method of claim 11, wherein said determining whether the identified data of the current outbound data transfer violates the DLP policy comprises:
    extracting the identified data from the network packet; and
    scanning the extracted data for violations of the DLP policy.

13. The method of claim 11, wherein said determining whether the identified data of the current outbound data transfer violates the DLP policy comprises:
    determining file path information from printing information in the network print request, the file path information identifying data to be printed by the network-based printer;
    locating the identified data using the file path information; and
    scanning the data located using the file path information to determine whether the data violates the DLP policy.

14. The method of claim 11, wherein said determining whether the identified data of the current outbound data transfer violates the DLP policy comprises:
    buffering a plurality of network packets containing the identified data associated with the network print request; and
    scanning the extracted data from the plurality of network packets to determine whether the extracted data violates the DLP policy, the extracted data being the identified data to be printed by the network-based printer.

15. A computing system, comprising:
    a memory; and
    a processor coupled with the memory to execute a network printing monitor of a data loss prevention (DLP) system, the network printing monitor to:
        monitor outbound data transfers performed by the computing system;
        detecting, by the DLP system, a network print request in a current one of the outbound data transfers being sent to a network-based printer over a network the network print request identifying data to be printed by the network-based printer;
        determine whether the identified data of the current outbound data transfer violates a DLP policy; and
        enforce a policy action when the current outbound data transfer violates the DLP policy.

16. The computing system of claim 15, wherein the computing system is an endpoint machine in the network.

17. The computing system of claim 15, wherein the computing system is a gateway in the network.

18. A non-transitory computer readable storage medium including instructions that, when executed by a processor, cause the processor to perform a method comprising:
    monitoring outbound data transfers performed by the computing system;
    detecting a network print request in a current one of the outbound data transfers being sent to a network-based printer over a network, the network print request identifying data to be printed by the network-based printer;
    determining whether the identified data of the current outbound data transfer violates a DLP policy; and
    enforcing a policy action when the current outbound data transfer violates the DLP policy.

19. The non-transitory computer readable storage medium of claim 18,
    wherein said monitoring comprises intercepting network packets,
    wherein said detecting comprises:
        identifying which of the network packets contain the network print request; and parsing the network print request to extract printing information, and wherein said determining whether the identified data of the current outbound data transfer violates the DLP policy comprises:

extracting the data from the network packet containing the network print request, wherein the extracted data is the data to be printed by the network-based printer; and scanning the extracted data for violations of the DLP policy.

20. The non-transitory computer readable storage medium of claim 18, wherein said monitoring comprises intercepting network packets, wherein said detecting comprises:

identifying which of the network packets contain the network print request; and parsing the network print request to extract printing information, and wherein said determining whether the identified data of the current outbound data transfer violates the DLP policy comprises:

determining file path information from printing information in the network print request, the file path information identifying data to be printed by the network-based printer;

locating the identified data using the file path information; and scanning the data located using the file path information to determine whether the data violates the DLP policy.

* * * * *